United States Patent
Jones

(10) Patent No.: US 7,837,586 B1
(45) Date of Patent: *Nov. 23, 2010

(54) SIMULTANEOUS MULTIPLE ROTATION INTERFACE

(75) Inventor: Dan Jones, Valley Mills, TX (US)

(73) Assignee: Epi-Energy, Ltd., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/388,232

(22) Filed: Feb. 18, 2009

Related U.S. Application Data

(63) Continuation of application No. 11/830,603, filed on Jul. 30, 2007, which is a continuation of application No. 10/869,303, filed on Jun. 16, 2004, now Pat. No. 7,258,642.

(51) Int. Cl.
*F16H 1/32* (2006.01)

(52) U.S. Cl. ...................... 475/168; 475/178

(58) Field of Classification Search ......... 475/162–165, 475/168, 176, 177, 178, 179
See application file for complete search history.

(56) References Cited

U.S. PATENT DOCUMENTS

| | | | |
|---|---|---|---|
| 81,329 A | 8/1868 | Barden | |
| 107,432 A | 9/1870 | Zeigler | |
| 850,597 A | 4/1907 | McCanna | |
| 955,458 A | 4/1910 | Hampton | |
| 1,141,626 A | 6/1915 | Granville | |
| 1,270,950 A | 7/1918 | Johanson | |
| 1,538,008 A | 5/1925 | Sharkey | |
| 1,538,328 A | 5/1925 | Holdener | |
| 1,770,016 A | 7/1930 | Ruliancich | |
| 1,833,993 A | 12/1931 | Hill | |
| 2,475,504 A | 7/1949 | Jackson | |
| 2,545,562 A | 3/1951 | Thiel, Jr. | |
| 2,677,288 A | 5/1954 | Gnahrick | |
| 3,037,400 A | 6/1962 | Sundt | |
| 3,043,164 A | 7/1962 | Sundt | |
| 3,049,019 A | 8/1962 | Lapointe et al. | |
| 3,430,523 A | 3/1969 | Merritt | |
| 3,477,316 A | 11/1969 | Wildhaber | |
| 3,668,947 A | 6/1972 | Waldorff et al. | |
| 4,050,331 A * | 9/1977 | Braren | 475/168 |
| 4,099,427 A | 7/1978 | Fickelscher et al. | |
| 4,183,267 A | 1/1980 | Jackson | |
| 4,193,324 A | 3/1980 | Marc | |
| 4,227,422 A | 10/1980 | Kawashima et al. | |
| 4,262,556 A | 4/1981 | Hart | |
| 4,297,920 A * | 11/1981 | Richter | 475/168 |
| 4,338,830 A | 7/1982 | Rodaway | |
| 4,452,102 A * | 6/1984 | Shaffer | 475/169 |

(Continued)

OTHER PUBLICATIONS

Sumitomo Machinery Corporation of America, "A Unique Concept in Speed Reducers & Gearmotors," 2002, United States.

*Primary Examiner*—Roger Pang
(74) *Attorney, Agent, or Firm*—Fulbright & Jaworski L.L.P.

(57) ABSTRACT

A simultaneous multiple rotation interface where a series of discs rotate about an eccentric camshaft. Each disc is engaged with the other by a series bearings embedded within each disc. As the camshaft rotates, each disc alternatively engages an outer shell so as to rotate the shell in the same direction as the shaft, albeit at a reduced speed.

20 Claims, 6 Drawing Sheets

U.S. PATENT DOCUMENTS

| | | |
|---|---|---|
| 4,512,213 A | 4/1985 | Newton |
| 4,542,664 A | 9/1985 | Sladek et al. |
| 4,594,915 A | 6/1986 | Braren et al. |
| 4,621,543 A * | 11/1986 | Gabilondo ................. 475/176 |
| 5,197,930 A * | 3/1993 | Imase ........................ 475/168 |
| 5,286,237 A | 2/1994 | Minegishi et al. |
| 5,292,289 A | 3/1994 | Ogata et al. |
| 5,324,240 A | 6/1994 | Guttinger et al. |
| 5,470,283 A | 11/1995 | Seidou et al. |
| 5,498,215 A | 3/1996 | Hosokawa et al. |
| 5,609,539 A * | 3/1997 | Herstek et al. .............. 475/168 |
| 5,697,868 A | 12/1997 | Akeel |
| 5,722,937 A | 3/1998 | Smith |
| 6,068,573 A | 5/2000 | Folino et al. |
| 6,220,115 B1 | 4/2001 | Hirn et al. |
| 6,261,199 B1 | 7/2001 | Schlangen |
| 6,280,359 B1 | 8/2001 | Moskob et al. |
| 6,336,881 B1 | 1/2002 | Rapp et al. |
| 6,428,437 B1 | 8/2002 | Schlanger |
| 6,440,030 B1 * | 8/2002 | Minegishi et al. ............ 475/178 |
| 6,453,772 B1 | 9/2002 | Moskob et al. |
| 6,490,941 B1 | 12/2002 | Hur et al. |
| 7,056,253 B2 | 6/2006 | Tsurumi et al. |
| 7,258,643 B2 | 8/2007 | Jones |
| 7,351,177 B2 * | 4/2008 | Christ ........................ 475/168 |
| 7,540,819 B1 * | 6/2009 | Jones ........................ 475/168 |
| 2003/0224893 A1 | 12/2003 | Tsurumi |

* cited by examiner

SIMULTANEOUS MULTIPLE ROTATION INTERFACE

CROSS-REFERENCE TO RELATED APPLICATIONS

This is a Continuation of U.S. patent application Ser. No. 11/830,603, filed on Jul. 30, 2007, entitled SIMULTANEOUS MULTIPLE ROTATION INTERFACE, which is a Continuation of the U.S. patent application Ser. No. 10/869,303, filed Jun. 16, 2004 [now U.S. Pat. No. 7,258,642 issued Aug. 21, 2007] entitled SIMULTANEOUS MULTIPLE ROTATION INTERFACE, the disclosures of which are expressly incorporated by reference herein.

TECHNICAL FIELD

The present invention generally relates to a simultaneous multiple rotation interface system. In particular, the present invention relates to a simultaneous multiple rotation interface wherein power is transmitted from an input to an output by a series of loosely seeded bearings acting in concert to provide for an extremely efficient, exceptionally powerful system.

BACKGROUND OF THE INVENTION

There are several types of rotation interfaces on the market today. Most commonly, these interfaces are found in speed transducers or gearboxes. Common examples of such products include: the worm speed reducer, helical reducer, coaxial reducer, and the planetary reducer. These devices are used in several areas of industry, including manufacturing, transportation, automotive, and hardware. However, all of these known products are limited in view of the present invention. Most importantly, these products do not incorporate the use of precisely aligned, seeded bearings as a mechanism to transfer power between an input and an output—this feature makes applicant's invention superior in view of devices known in the art.

The novel design of applicant's present invention overcomes the problems associated with products known in the art. For example, known rotation interfaces depend on gears, pins, or teeth to transfer power from an input to an output. As such, when these products fail, it is often the result of these teeth, pins, or gears giving way to the shear or lateral forces exerted upon them. In fact, it is well known in the art that the primary cause of failure in typical gear boxes is usually tooth breakage, or accelerated wear associated with high speed pinions. This problem is exaggerated in the common case of shock loading. However, applicant's invention handles these damaging forces extremely well. Bearings are relied upon to withstand such forces; because these bearings are able to rotate, or "give," and because the force is distributed evenly among all bearings, the invention is able to withstand forces that other products cannot.

Friction breakdown is a common problem associated with currently available rotation interfaces. There is some degree of friction along all moving internal parts, as such, regular lubrication maintenance is essential. Without such lubrication, friction build-up would surely cause a breakdown of the device from the inside out. However, the present invention reduces virtually all internal friction as it relies on a series reliable, highly durable bearings to transfer power. Employment of such bearings reduces "sliding parts" friction because these bearings effectively bear the brunt of competing forces acting on the device. Further, these bearings are aligned so that forces acting on the system are evenly distributed among all of the bearings. Elimination of "sliding parts" friction and effective force distribution among all bearings provides for an exceptionally efficient device with an extremely long working life.

Another problem associated with available rotation interfaces is loss of mechanical efficiency. Often poor design, friction, wear and tear, and poor component qualities produce a power loss between an input and an output. However, the unique construction of the present invention provides for a negligible power loss between the input and the output. That is, each bearing engages with or "grabs" the second drive at the same precise moment so that each drive is perfectly in sink with the other. Further, each bearing is aligned so as to produce a very tight component fit between the first drive and second drive, as such, there is practically no slack between component parts.

Applicant's invention is very cost-effective in view of known products. The novel design of applicant's invention provides for a manufacturing process that is relatively simple and cost effective. As such, the present invention is much cheaper than presently known, similar products. Applicant's invention, when incorporated as part of a larger, more expensive system, can greatly reduce the "components parts" cost of that system. Also, applicant's invention can readily be incorporated with cheaper products that would otherwise be cost-prohibitive. In addition, the costs of known products increases in nonlinear fashion as rotation interfaces are manufactured to provide for double or triple speed reductions. However, the present invention, through its novel design, is able to produce single, double, or triple reduction while avoiding soaring production costs.

In view of the limitations of known products, there is a great need for a rotation interface that is friction-free, durable, mechanically efficient, and cost-effective. Applicant's invention, by its novel design and straightforward manufacture process, provides an improved substitute for currently available, similar products.

BRIEF SUMMARY OF THE INVENTION

In view of the foregoing, it is an object of the present invention to provide a device where the rotational direction of the low speed shaft is the same as the rotational direction of the high speed shaft.

It is an object of the present invention to provide a device where the rotational direction of the low speed shaft is the opposite from the rotational direction of the high speed shaft.

It is another object of the present invention to provide a device that produces double or triple speed reductions inexpensively.

It is another object of the present invention to provide a device that has an excellent power to weight ratio.

It is another object of the present invention to provide a device that is exceptionally mechanically efficient.

It is another object of the present invention to provide a device that is highly cost-effective.

It is another object of the present invention to provide a device that is extremely durable.

It is another object of the present invention to provide a device having a straightforward manufacturing process.

It is another object of the present invention to provide a device that can withstand extreme lateral or sheer forces.

It is yet another object of the present invention to provide a device that has exceptionally low internal friction.

In satisfaction of these and other related objectives, applicant's present invention provides its practitioner with a novel system to achieve an input/output rotation speed differential.

This system provides for a highly efficient, exceptionally powerful, durable, and cost-effective interface. As will be discussed in the specification to follow, practice of the present invention involves a combination of components so aligned to provide efficient operation of several types of devices.

The preferred embodiment of the present invention incorporates a dually eccentric shaft where a portion of the shaft is offset from its center in one direction and another portion of the shaft is offset from the center by the same amount in the opposite direction. This shaft has the generic shape of a camshaft. Surrounding each eccentric, or offset, portion of the shaft is a driver disc. Each driver disc is so spaced from the shaft so that a series of ball bearings fits between the shaft and disc to allow effective rotation of each part. By operation of its camshaft configuration, as the shaft is rotated in a given direction, each driver disc rotates about the shaft in the opposite direction, albeit at a reduced speed. Each driver disc contains a series of engagement dowels along its outer circumference embedded so that a half-circumference of each dowel is contained within the driver disc and the other half-circumference extends from the driver disc in half-circle fashion. These engagement dowels engage or "grab" a radial output as the driver discs rotate. By virtue of the eccentric rotation of each driver disc, each disc engages the radial output at distinct points. As the discs engage the radial output, each disc "pushes" the output in the same rotational direction as the camshaft.

Finally, each driver disc is aligned with respect to the other such that each driver disc center point is offset from the other in an amount equal to twice the eccentricity of the camshaft. A plurality of loosely embedded bearings is sandwiched between the driver discs. These bearings are embedded in each disc so that one-half of the diameter of each bearing is contained within each disc. As the discs rotate in their eccentric fashion, the bearings act as a binding mechanism, ensuring that each disc is in sink with the other.

An alternative embodiment of the present invention involves a series of discs that rotate about a central pin and within the inner circumference of a radial cage. An input and an output shaft are centrally, axially aligned along said central pin and effectively sandwich the series of discs between one another.

In the alternative embodiment, an input shaft is attached to an input disc that is characterized by a centrally aligned portion and an eccentric flange extending therefrom. The eccentric flange is axially aligned, but centrally offset from the central shaft so that a large radius extends in one direction, and a small radius extends in the opposite direction. As such, as the eccentric flange rotates about the central pin, the circle formed about the diameter of the eccentric flange sweeps around the centrally aligned portion of the disc in eccentric fashion, at reduced speed.

A first driver disc is mated with the input disc though a series of radially aligned, embedded bearings. The first driver disc is characterized by an enlarged inner circumference that allows for eccentric rotation about the central pin. Bearings are positioned between the discs so that the first driver disc may follow the eccentric rotation of the eccentric flange. As the first driver disc is mated with the input disc eccentric flange, it eccentrically rotates about the central pin. In addition, the first driver disc is engaged with a centrally aligned, intermediate disc. Both the first driver disc and the intermediate disc rotate at a speed equal to the input rotational speed by the reciprocal of the number of radially aligned bearings between the input disc and first driver disc.

The intermediate disc also is characterized by a centrally aligned portion, and a centrally offset, eccentric flange. By the same operation as above, the circle formed about the diameter of the second eccentric flange sweeps out along the radius of the centrally aligned portion, at a reduced speed. As seen before, the second eccentric flange engages a second driver that rotates about central pin in eccentric fashion at a further reduced speed. Finally, the second driver disc is engaged with centrally aligned output disc through a series of loosely embedded bearings. These bearings positioned to allow for the eccentric motion of the second driver disc and the central position of the output disc.

Summarily, the first driver disc rotates about the central pin at a reduced speed by virtue of its eccentric motion, caused by engagement with the input shaft eccentric flange. However, the first driver disc remains engaged with centrally aligned components, specifically the intermediate disc, through loosely seeded bearings. The intermediate disc centrally rotates about the central pin, sharing the reduced speed of the first driver disc. This speed reduction operation is carried out a second time on a second driver disc. The second driver disc eccentrically rotates about the central pin, at a further reduced speed, by virtue of its engagement with the intermediate disc eccentric flange. Moreover, the second driver disc remains engaged with, and shares the same rotational velocity as a centrally aligned output disc Again, this is made possible by the radially aligned, loosely seeded bearings between the two discs.

An important feature associated with the rotation interface of the present invention is that the rotational speed reduction along the interface is equal to the reciprocal of the number of bearings along the interface. As such, any number of combinations can be assembled from reduction stage to reduction stage to easily produce almost any differential between input and output speed.

BRIEF DESCRIPTION OF THE DRAWINGS

Applicant's invention may be further understood from a description of the accompanying drawings, wherein unless otherwise specified, like referenced numerals are intended to depict like components in the various views.

DETAILED DESCRIPTION OF THE INVENTION

Figure 1:
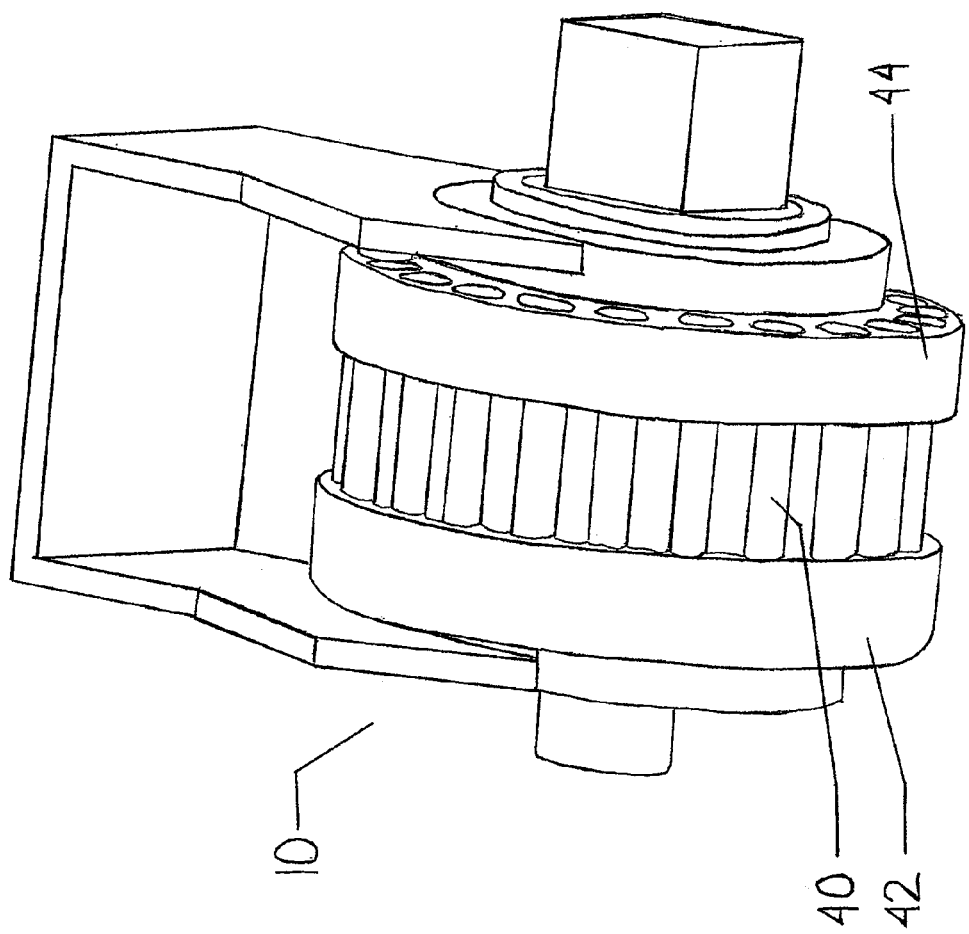
FIG. 1 is a perspective view of the preferred embodiment of the present invention.

Referring to FIG. 1, the simultaneous multiple rotation interface of the present invention is generally referred to as device 10. In the preferred embodiment, device 10 generally consists of metal alloy, or some other suitably rigid material.

Figure 2:
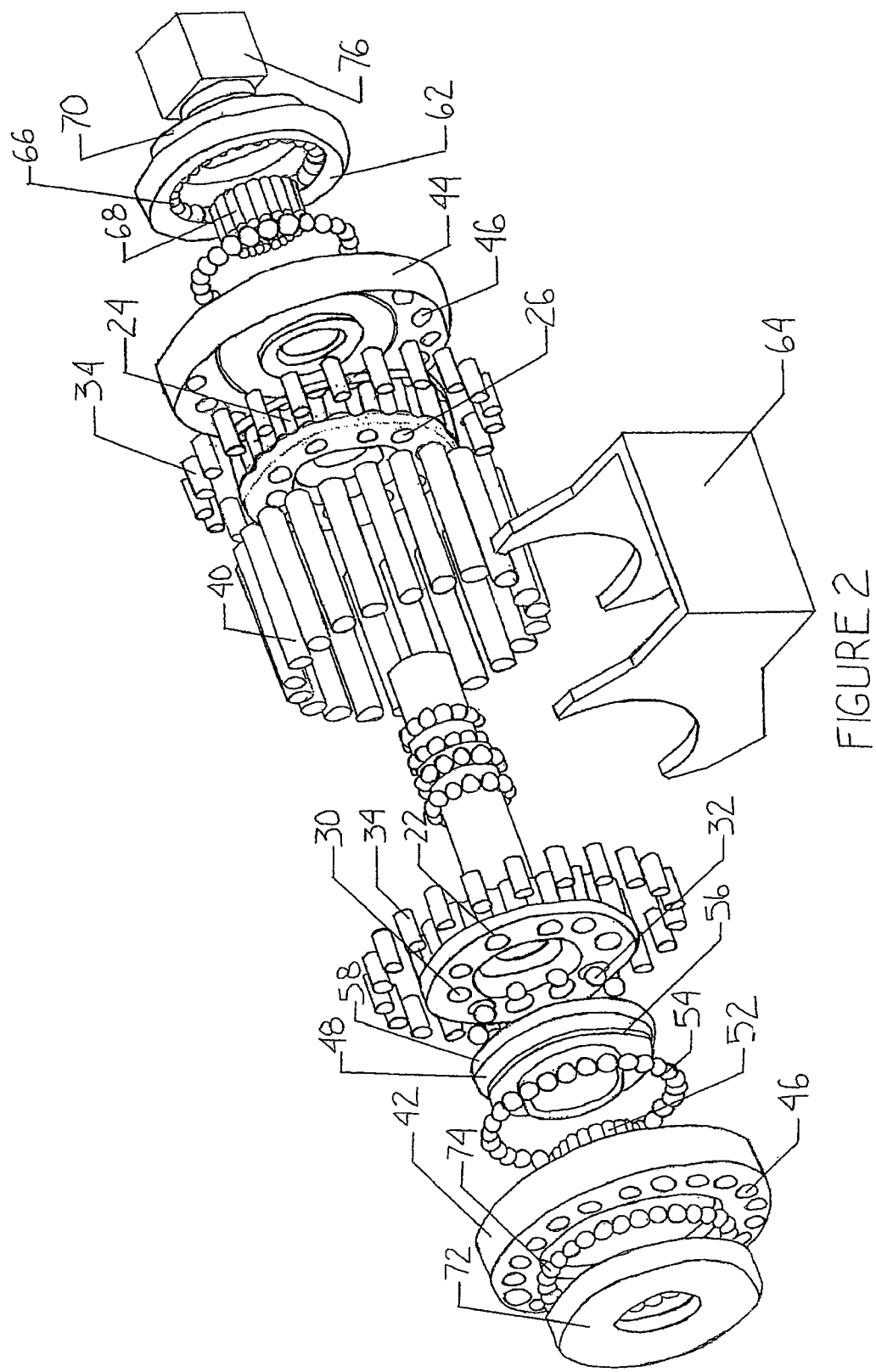
FIG. 2 is an exploded perspective view of the preferred embodiment of the present invention.
Figure 3:
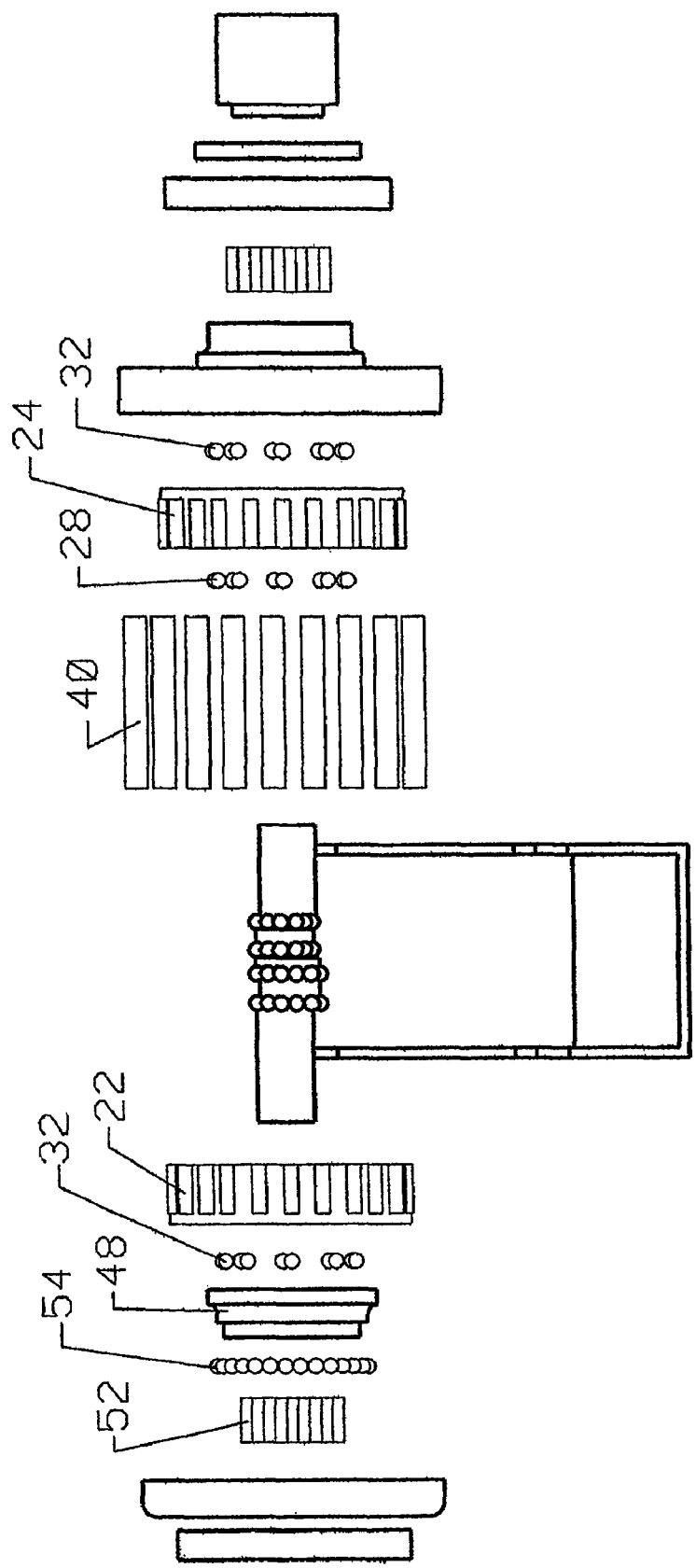
FIG. 3 is an exploded cross sectional view of the preferred embodiment of the present invention.
Figure 4:
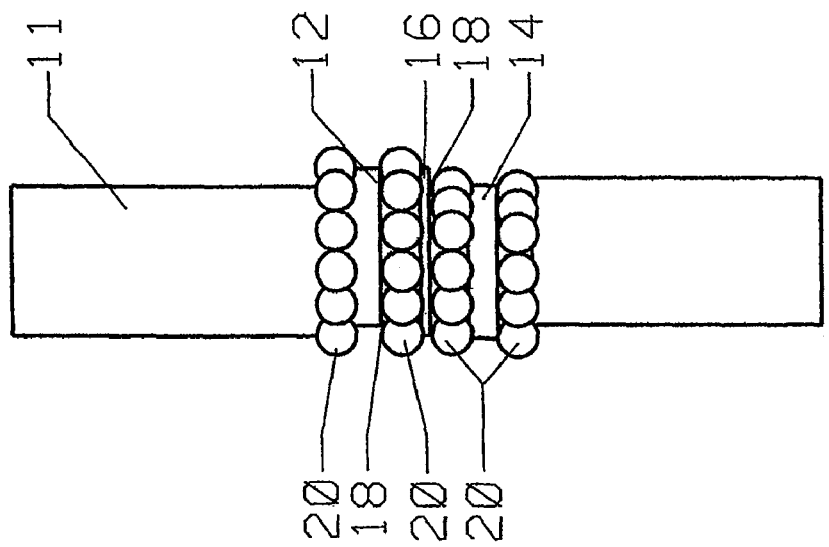
FIG. 4 is a perspective view of the eccentric camshaft and the camshaft bearing of the preferred embodiment of the present invention.

In the preferred embodiment shown in FIG. 2, FIG. 3, and particularly FIG. 4, system 10 includes eccentric camshaft 11. In the preferred embodiment, camshaft 11 is an eccentric camshaft with an eccentric portion 12 offset from the center of the shaft and an eccentric portion 14 offset from the center of the shaft by the same amount, in the diametrically opposite direction from eccentric portion 12. Camshaft 11 further contains a central portion 16. Between central portion 16 and offset portion 12, and between central portion 16 and offset portion 14, are camshaft bearing grooves 18. Bearing grooves 18 are sized to allow bearings 20 to remain embedded, and freely rotate, between central portion 16 and eccentric portion 12, and between central portion 16 and eccentric portion 14. Other embodiments are envisioned where camshaft 12 contains three or more eccentric portions to allow for three or more bearing grooves. Such embodiments are thought to be particularly useful for multiple-speed reductions between the input and the output.

Again, referring to FIG. 2, FIG. 3, and particularly FIG. 4, bearings 20 are embedded in bearing grooves 18 and also rest along the outer circumference of camshaft 11; on the edges of eccentric portions 12 and 14 furthest from central portion 16.

Referring principally to FIG. 2 and FIG. 3, driver disc 22 and driver disc 24 surround camshaft 11 whereby driver disc 22 is engaged with camshaft 11 at eccentric portion 12, and driver disc 24 is engaged with camshaft 11 at eccentric portion 14. Driver disc 22 and driver disc 24 are engaged with one another along a camshaft central portion 16. Driver disc 22 and driver disc 24 are spaced from camshaft 11 such that bearings 20 snugly fit within the void between disc 22 and disc 24, and camshaft 11. Bearings 20 allow disc 22 and disc 24 to rotate about camshaft 11 while remaining centrally aligned with respect to offset portions 12 and 14, respectively. By virtue of its eccentric shape, as camshaft 11 rotates in a given direction, driver disc 22 and driver disc 24 rotate about camshaft 11, in the opposite direction. Other embodiments are envisioned where other means are used to centralize disc 22 and disc 24 with respect to offset portions 12 and 14, respectively. For instance, slideably insertable pins are thought to be a useful substitute.

Driver disc 22 and driver disc 24 each contain inner bearing slots 26. Bearing slots 26 receive and hold driver disc inner bearings 28 such that one half of each inner bearing 28 is contained within each driver disc. As each driver disc contains one half of each inner bearing 28 therein; each driver is engaged with the other in a low-friction environment. In the preferred embodiment, the diameter of each bearing slot 26 is equal to the diameter of each driver disc bearing 28 and twice the eccentricity of camshaft 11. Such an arrangement allows for each driver disc to rotate about the camshaft in eccentric fashion, while having their respective center points offset by twice the eccentricity of the camshaft, and remain engaged with one another. In the preferred embodiment, there is only one set of inner bearings 28, however, other embodiments are envisioned where two or more sets of inner bearings are sandwiched between three or more driver discs.

Referring to FIG. 2, driver disc 22 and driver disc 24 each contain outer bearing slots 30. Bearing slots 30 receive driver disc outer bearings 32 such that one half of the diameter of outer driver disc bearings 30 are contained within each driver disc and the other half of bearings 30 protrudes from each disc in half-circle like fashion. In the preferred embodiment, outer bearing slots 30 are of half-spherical form, and have a diameter equal to the diameter of driver disc outer bearings 32 and the amount of eccentricity of camshaft 11. Such arrangement allows each driver disc to rotate about camshaft 11 in eccentric fashion, while remaining engaged with centrally-aligned components within device 10.

Engagement means 34 is located along the outer circumferences of driver disc 22 and driver disc 24. In the preferred embodiment, engagement means 34 is a series of engagement dowels along driver disc 22 and driver disc 24 outer circumferences, and are embedded so that a half-circumference of each dowel is contained within each driver disc and the other half-circumference protrudes from the driver disc in half-circle fashion. These engagement dowels engage or "grab" outer radial shell 40 as the driver discs rotate.

Referring principally to FIG. 1 and FIG. 2, radial shell 40 surrounds driver disc 22 and driver disc 24. As driver disc 22 and disc 24 rotate about camshaft 11 in eccentric fashion, each disc engages radial shell 40 at diametrically opposite points along radial shell 40. In the preferred embodiment, radial shell 40 consists of a series a parallel rods so aligned to receive and reversibly engage with engagement means 34. However, one may easily envision embodiments where radial shell 40 is configured otherwise, such as narrow grooves. By virtue of the eccentric rotation of driver disc 22 and driver disc 24, engagement means 34 engages and pushes radial shell 40 in the same rotational direction as camshaft 11, albeit at a reduced rotational velocity. Radial shell 40 is axially, centrally fixed with respect to camshaft 11 by first radial shell housing 42 and second radial shell housing 44. First radial shell housing 42 and second radial shell housing 44 are each discs, each having radial shell receiving means 46, which are radially aligned along the outer circumference of first and second radial shell housing.

Figure 5:
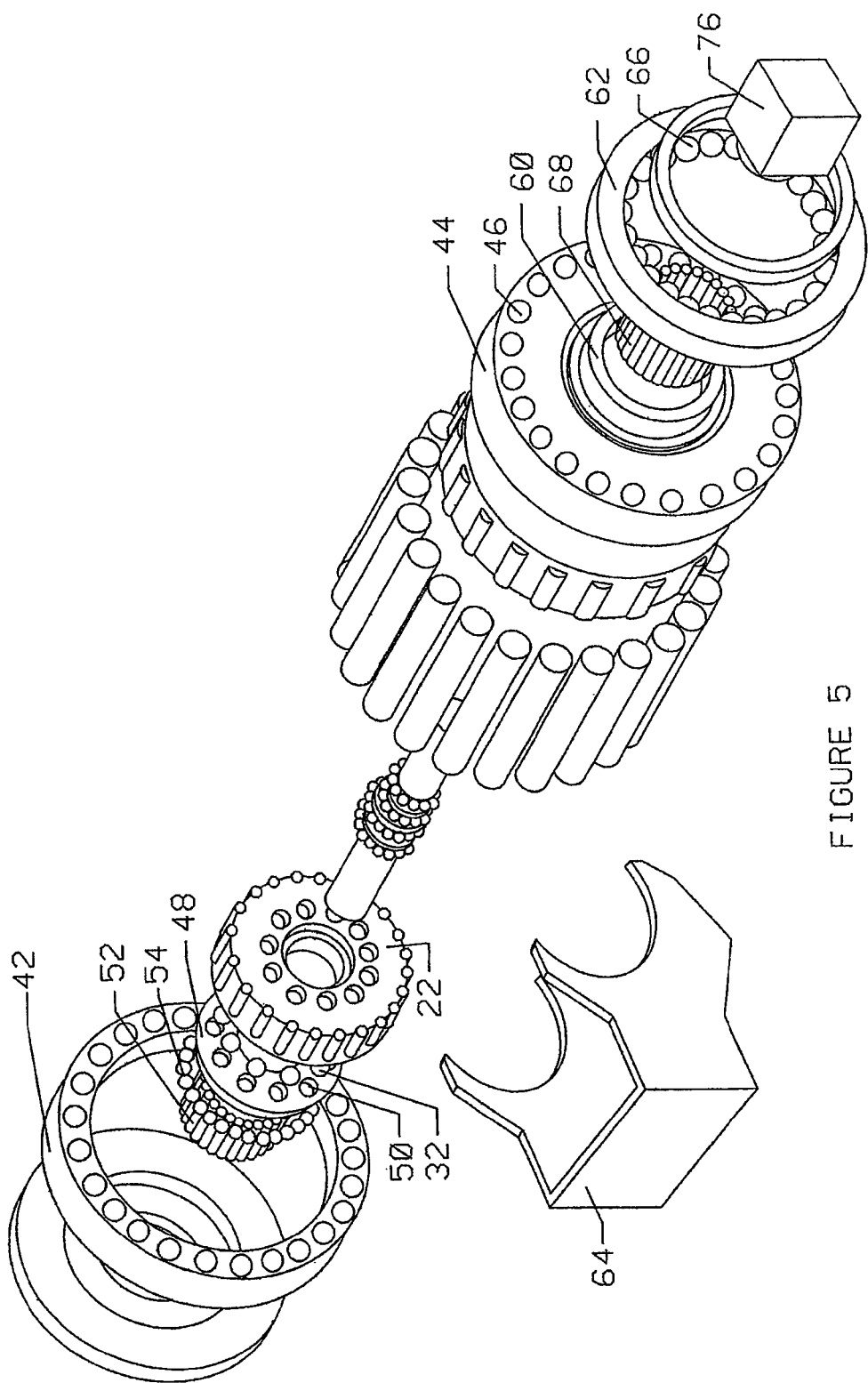
FIG. 5 is an exploded perspective view of the preferred embodiment of the present invention.

Referring principally to FIG. 5, stabilizing ring 48 is engaged with driver disc 22 by receiving driver disc outer bearings 32 in stabilizing ring slots 50. Ring slots 50 are half-spherical in shape and have a diameter equal to the diameter of driver disc outer bearings 32 and the degree of eccentricity of camshaft 11. This allows stabilizing ring 48 to be engaged with and share the rotational motion of driver disc 22 while remaining centrally, axially aligned with camshaft 11. Camshaft 11 and stabilizing ring 48 are spaced from one another to allow stabilizing ring pins 52 to snugly fit between ring 48 and camshaft 11. Each pin 52 is parallel to the other and the combination of pins 52 forms a ring shape surrounding camshaft 11. When device 10 is in use, stabilizing ring pins 52 rotate under the influence of camshaft 11 and stabilizing ring 48 thereby allowing camshaft 11 to rotate in a given direction and allow stabilizing ring 48, engaged with disc 22, to rotate in the opposite direction.

In the preferred embodiment, stabilizing ring 48, is flanged shaped so that an inner portion 56 and an outer portion 58 share a same inner circumference yet form a shelf along their outer circumferences. First radial shell housing bearings 54 fit between the outer circumference of outer portion 58 and the inner circumference of first radial shell housing 42.

Again referring to FIG. 5, first radial shell housing 42 rests against bearings 54. Bearings 54 are aligned so that when device 10 is in use, stabilizing ring 48, engaged with driver disc 22 may rotate in one direction, and first radial shell housing 42 may rotate in the other direction. First radial shell housing 42 has an inner circumference sized so that bearings 54 fit snugly within radial shell housing 42 and so that radial shell housing 42 remains centrally, axially fixed with respect to camshaft 1.

Referring to FIG. 2, camshaft 11 and attachment bearings 74 provide support and stability for attachment ring 72. In the preferred embodiment, attachment ring 72 provides a point where device 10 may be secured, and held fixed, with respect to its surrounding environment. As depicted in FIG. 2 and FIG. 5, attachment ring 72 is of such size that it may be welded to a support frame, for example, support frame 64. However, other embodiments are envisioned where attachment ring 72 takes on other forms. For example, attachment ring 72 could be of rectangular shape and secured along the walls of a shaft.

Attachment bearings 74 are held between inner portion 56 and attachment ring 72. Attachment ring bearings 74 snugly fit between inner portion 56 and attachment ring 72 and allow attachment ring 72 to remain fixed with respect to device 10 surrounding environment while allowing device 10, and particularly radial housing 42 to rotate in a given direction.

Referring principally to FIG. 5 and FIG. 3, second radial shell housing 44 rotates independently of driver disc 24. That is, outer bearings 32 are sandwiched between housing 44 and disc 24 to allow independent rotation. Camshaft 11 and second radial shell housing 44 are spaced from one another to allow radial shell housing pins 68 to snugly fit between second radial shell housing 44 and camshaft 11. Each pin 68 is parallel to the other and the combination of pins 68 forms a ring shape surrounding camshaft 11. When device 10 is in use, second radial shell housing pins 68 rotate under the influence of camshaft 11 and second radial shell housing 44, thereby allowing camshaft 11 to rotate in a given direction and allow second radial shell housing 44, engaged with disc 24, to rotate in the opposite direction.

Second radial shell housing 44 also contains an inner flange 60. Radial flange 60 provides interior support and stability for attachment ring 62. In the preferred embodiment, attachment ring 62 provides a point where device 10 may be secured, and held fixed, with respect to its surrounding environment. As depicted in FIG. 2 and FIG. 5, attachment ring 62 is of such size that it may be welded to a support frame, for example, support frame 64. However, other embodiments are envisioned where attachment ring 62 takes on different forms. For example, attachment ring 62 could be of rectangular shape and secured along the walls of a shaft. Attachment ring 62 is sized so that its inner circumference is spaced from flange 60 to allow attachment ring bearings 66 to snugly fit between flange 60 and attachment ring 62. Attachment ring bearings 66 allow attachment ring 62 to remain fixed with respect to device 10 surrounding environment while allowing device 10, and particularly radial housing 44 to rotate in a given direction.

Inner flange 60 is mated with output shaft 76 such that the rotational speed of output shaft 76 is that of radial shell 40, radial shell first housing 42 and radial shell second housing 44.

Figure 6:
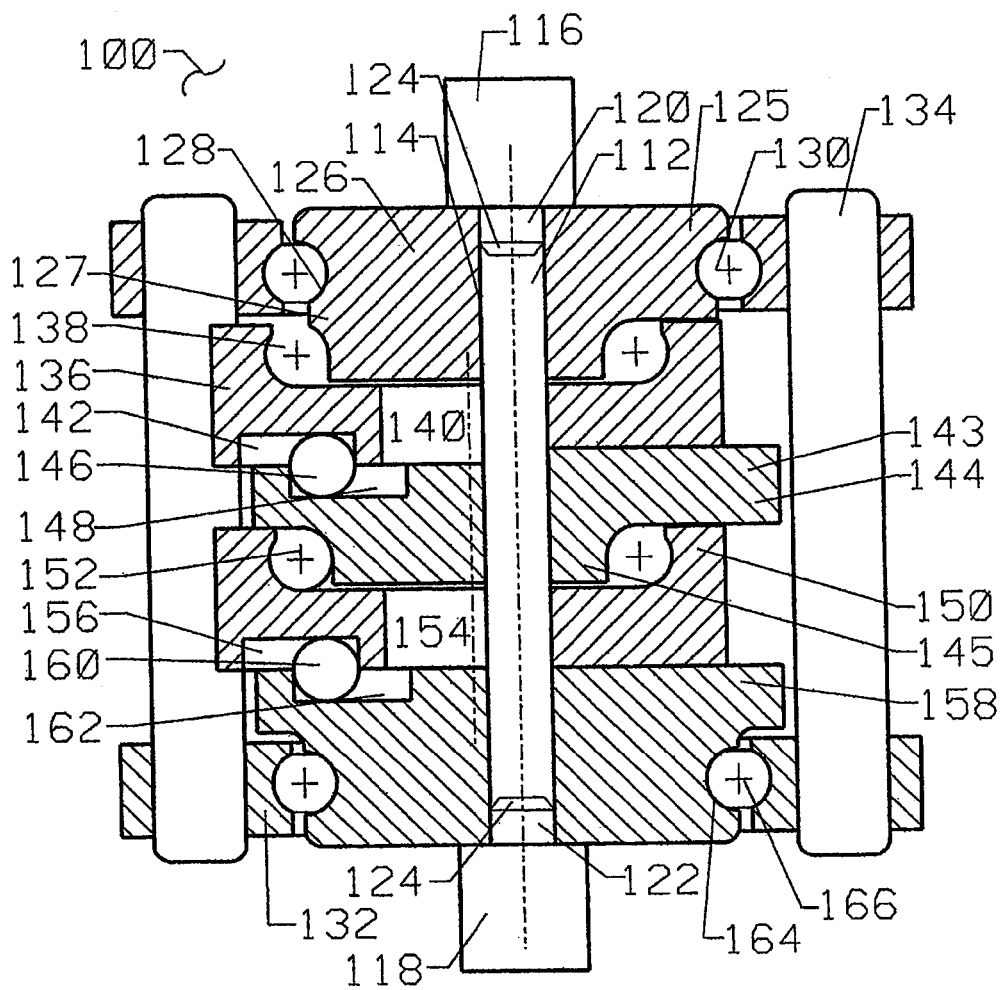
FIG. 6 is a cross sectional view of the an alternative embodiment of the present invention.

Referring to FIG. 6, an alternative embodiment of the present invention is generally referred to as device 100. Device 100 contains a central pin 112. In the preferred embodiment, central pin 112 is centered about and runs thought central shaft 114. Central pin 112 is responsible for holding input 116 and output 118 axially, centrally aligned with respect to one another.

Both input 116 and output 118 contain radial flange 120 and 122, respectively. Radial flange 120 and radial flange 122 each have central pin receiving means 124 that slideably receives central pin 112, and is configured to allow radial pin 112 to freely rotate within radial flange 120 and 122. In the preferred embodiment, central pin receiving means is a cylindrical-shaped shell, bored out of flanges 120 and 122, with a diameter sized so as to allow central pin 112 to fit within receiving means 124 and rotate freely thereof.

Again referring to FIG. 6, input disc 125 is attached to input 116. As will be further discussed, input disc is characterized by a centrally aligned top portion 126 and an eccentric portion 127. Input disc 125 is centrally, axially aligned with input 116 and mates with input 116 so as to share the same rotational speed as input 116. That is, input 116 and input disc 125 may simply be welded together along the union between input 116 and disc 125 to provide uniform rotation. Input disc 125 further contains bearing groove 128. Bearing groove 128 runs along the outer circumference of disc 125 in ring-like fashion, and is of a concave, half-circle shape. Bearing groove 128 receives input disc bearings 130 and allows bearings 130 to rotate about an axis parallel to central pin 112. Bearings 130 surround disc 125, remaining loosely embedded within groove 128 so as to allow disc 125 to rotate freely with respect to radial cage 134 and radial cage support frame 132.

Principally referring to FIG. 6, disc 125 is characterized by centrally aligned portion 126 and eccentric flange 127. Central portion 126 is centrally, axially aligned with central pin 112, so arranged that its radius is fixed within its plane of rotation. Disc 125 is further characterized by eccentric radial flange 127. Eccentric radial flange 127 extends from central portion 126, and is axially aligned, but centrally offset with respect to central pin 112. As eccentric flange 127 rotates about pin 112, a smaller offset circle sweeps around the larger, uniform radius of 126. This sweeping motion of eccentric flange 127 is the mechanism responsible for providing a reduction in rotational speed through use of device 100.

Referring to FIG. 6, first driver disc 136 is mated with eccentric flange 127 through a series of bearings 138. Bearings 138 are embedded between flange 127 and disc 136 and positioned between the outside of flange 127 and the inside of disc 136. That is, disc 136 is of a general bowl shape so that bearings 138 rest along the inside rim of disc 136, where bearings 138 are supported along their inside by flange 127. Bearings 138 are embedded between flange 127 and driver disc 136 so as to allow driver disc 136 to follow the eccentric, sweeping motion of flange 127. Disc 136 is axially aligned and centrally offset with respect to central pin 112 and is characterized by an enlarged inner circumference 140. Inner circumference 140 is offset with respect to pin 112 and further allows disc 136 to follow the eccentric rotation of flange 127 and rotate about pin 112 in eccentric fashion.

Disc 136 contains first driver disc bearing slots 142. In the preferred embodiment, bearing slots 142 are radially aligned, are of half-spherical shape, and have a diameter equal to the diameter of bearings 146 and the eccentricity, or offset amount of eccentric flange 127. Such arrangement allows disc 136 to rotate about central pin 112 in eccentric fashion, while remaining engaged with centrally-aligned components within device 100.

Referring to FIG. 6, central disc 143 is mated with first driver disc 136 through a series of seeded bearings 146. Disc 143 contains central driver disc bearing slots 148. In the preferred embodiment, bearing slots 148 are radially aligned, are of half-spherical shape, and have a diameter equal to the diameter of bearings 146 and the eccentricity, or offset amount of eccentric flange 127. Such arrangement allows disc 143 to rotate about central pin 112 while remaining axially, centrally aligned with respect to central pin 112, while remaining engaged with eccentrically rotating first driver disc 136.

Central disc 143 is characterized by centrally-aligned portion 144 and eccentric flange 145. Central portion 144 is centrally, axially aligned with central pin 112, so arranged that its radius is fixed within its plane of rotation. Disc 143 is further characterized by eccentric radial flange 145. Eccentric radial flange 145 extends from central portion to central pin 112. As eccentric flange 145 rotates about pin 112, a smaller offset circle sweeps around the larger, uniform radius of 144. This sweeping motion of eccentric flange 145 is the mechanism responsible for providing a second reduction in rotational speed between input 116 and output 118. Importantly, first driver disc 136 and central disc 143 share the same rotational speed. That is, disc 136 and disc 144 have each been singly reduced by virtue of the eccentric motion of flange 127.

Referring to FIG. 6, second driver disc 150 is mated with eccentric flange 145 through a series of bearings 152. Bearings 152 are embedded between flange 145 and disc 150 and positioned between the outside of flange 145 and the inside of disc 150. That is, disc 150 is of a general bowl shape so that bearings 152 rest along the inside rim of disc 150, where bearings 152 are supported along their inside by flange 145. Bearings 152 are embedded between flange 145 and driver disc 150 so as to allow second driver disc 150 to follow the eccentric, sweeping motion of flange 145. Disc 150 is axially aligned and centrally offset with respect to central pin 112 and is characterized by an enlarged inner circumference 154. Inner circumference 154 is offset with respect to pin 112 and further allows disc 150 to follow the eccentric rotation of flange 145 and rotate about pin 112 in eccentric fashion.

Disc 150 contains second driver disc bearing slots 156. In the preferred embodiment, bearing slots 156 are radially aligned, are of half-spherical shape, and have a diameter equal to the diameter of bearings 146 and the eccentricity, or offset amount of eccentric flange 145. Such arrangement allows disc 150 to rotate about central pin 112 in eccentric fashion, while remaining engaged with centrally-aligned components within device 100.

As seen in FIG. 6, output disc 158 is mated with second driver disc 150 through a series of seeded bearings 160. Output disc 158 contains output driver disc bearing slots 162. In the preferred embodiment, bearing slots 162 are radially aligned, are of half-spherical shape, and have a diameter equal to the diameter of bearings 160 and the eccentricity, or offset amount of eccentric flange 145. Such arrangement allows disc 158 to rotate about central pin 112 while remaining axially, centrally aligned with respect to central pin 112, while remaining engaged with eccentrically rotating first driver disc 150.

Output disc 158 is centrally, axially aligned with output 118 and mates with output 118 so as to share the same rotational speed as output 118. That is, output 118 and output disc 158 may simply be welded together along the union between output 118 and disc 158 to provide uniform rotation. Output disc 158 further contains bearing groove 164. Bearing groove 164 runs along the outer circumference of disc 158 in ring-like fashion, and is of a concave, half-circle shape. Bearing groove 164 receives output disc bearings 166 and allows bearings 166 to rotate about an axis parallel to central pin 112. Bearings 166 surround disc 158, remaining loosely embedded within groove 164 so as to allow disc 158 to rotate freely with respect to radial cage 134 and radial cage support frame 132. Importantly, second driver disc 150 and output disc 158 share the same rotational speed. That is, disc 150 and disc 158 have each been doubly reduced by virtue of the eccentric motion of flange 127 and eccentric flange 145.

As best seen in FIG. 6, radial cage 134 and radial cage support frame 132 surround the combination of discs mentioned above. Support frame 132 receives radial cage 134 and holds cage 134 fixed parallel to central pin 112. Further, support frame 132 is engaged with input disc 126 and output disc 158 through bearings 130 and bearings 152 respectively. As mentioned, bearings 130 and 152 allow the combination of discs to rotate with respect to both support frame 132 and cage 134.

Although the invention has been described with reference to specific embodiments, this description is not meant to be construed in a limited sense. Various modifications of the disclosed embodiments, as well as alternative embodiments of the inventions will become apparent to persons skilled in the art upon reference to the description of the invention. It is, therefore, contemplated that the appended claims will cover such modifications that fall within the scope of the invention.

I claim:

1. A method for increasing torque about an output member, said method comprising:
   eccentrically moving a plurality of driver discs about an input member;
   directly engaging a first of said plurality of driver discs with at least one other of said plurality of driver discs; and
   wherein said direct engagement comprises a plurality of ball bearings partially seated in said first driver disc and said at least one other driver disc.

2. The method of claim 1 wherein said eccentric movement effectuates the rotational speed of said output member.

3. The method of claim 1 wherein said direct engagement comprises: the movement of said first of the plurality of driver discs effectuating the movement of said at least one other of the plurality of driver discs.

4. The method of claim 1 further comprises: engaging said plurality of driver discs with a radial shell member.

5. The method of claim 4, wherein said radial shell member comprises:
   a first radial shell housing member;
   a second radial shell housing member; and
   a series of parallel pins, wherein said first and second housing members are configured to receive said pins.

6. The method of claim 4, wherein said radial shell member comprises: a series of narrow grooves.

7. The method of claim 4 wherein said engagement between said plurality of driver discs and said radial shell member comprises: a plurality of dowels embedded along the outer circumferences of said plurality of driver discs, such that a first half-circumference of each dowel is contained within each driver disc and a second half-circumference of each dowel protrudes from each driver disc.

8. An apparatus for increasing torque about an output member, said apparatus comprising:
   a rotating input member, said input member comprising one or more portions centrally offset, by the same amount in a diametrically opposite direction, from the axis of rotation of said input member;
   a plurality of driver discs, said driver discs in rotational communication with said input member through said one or more eccentrically offset portions of said input member, and
   a first engagement mechanism effective to directly engage a first of said plurality of driver discs with at least one other of said plurality of driver discs, wherein said first engagement mechanism comprises a plurality of ball bearings partially seated in said first driver disc and said at least one other driver disc.

9. The apparatus of claim 8, further comprising:
   a radial shell member, said shell member configured to surround said plurality of driver discs.

10. The apparatus of claim 9, wherein said radial shell member comprises:
    a first radial shell housing member;
    a second radial shell housing member; and
    a series of parallel pins, wherein said first and second housing members are configured to receive said pins.

11. The apparatus of claim 9, wherein said radial shell member comprises: a series of narrow grooves.

12. The apparatus of claim 9, further comprising:
    a second engagement mechanism effective to engage said plurality of driver discs with said radial shell member.

13. The apparatus of claim 12 wherein said second engagement mechanism comprises: a plurality of dowels embedded along the outer circumferences of said plurality of driver discs, such that a first half-circumference of each dowel is contained within each driver disc and a second half-circumference of each dowel protrudes from each driver disc.

14. The apparatus of claim 8 wherein said direct engagement comprises: the movement of said first of the plurality of driver discs effectuating the movement of said at least one other of the plurality of driver discs.

15. The apparatus of claim 8 wherein the eccentric rotation of said driver discs effectuate the rotational speed of said output member.

16. A method for increasing torque about an output member, said method comprising:
   eccentrically moving a plurality of driver discs about an input member; and
   directly engaging a first of said plurality of driver discs with at least one other of said plurality of driver discs; and
   engaging said plurality of driver discs with a radial shell member;
   wherein said output member has the same rotational speed as said radial shell member.

17. The method of claim 16 wherein said direct engagement comprises: the movement of said first of the plurality of driver discs effectuating the movement of said at least one other of the plurality of driver discs.

18. The method of claim 16, wherein said radial shell member comprises:
   a first radial shell housing member;
   a second radial shell housing member; and
   a series of parallel pins, wherein said first and second housing members are configured to receive said pins.

19. The method of claim 18, wherein said radial shell member comprises: a series of narrow grooves.

20. The method of claim 18 wherein said engagement between said plurality of driver discs and said radial shell member comprises: a plurality of dowels embedded along the outer circumferences of said plurality of driver discs, such that a first half-circumference of each dowel is contained within each driver disc and a second half-circumference of each dowel protrudes from each driver disc.

* * * * *